United States Patent [19]
Kleykamp et al.

[11] 4,306,740
[45] Dec. 22, 1981

[54] HOSE CLAMP STRUCTURE AND HOSE CONSTRUCTION EMPLOYING SAME

[75] Inventors: Donald L. Kleykamp, Springboro; Steven G. McCord, Centerville, both of Ohio; William J. LiVolsi, Washington Crossing, Pa.; Raymond L. Trueblood, New Carlisle, Ohio

[73] Assignee: Dayco Corporation, Dayton, Ohio

[21] Appl. No.: 137,165

[22] Filed: Apr. 4, 1980

[51] Int. Cl.³ .............................................. F16L 33/22
[52] U.S. Cl. .................................... 285/39; 24/20 TT; 29/450; 285/236; 285/242; 285/DIG. 22
[58] Field of Search ............... 285/236, 252, 253, 242, 285/DIG. 22, 420, 39; 24/274 WB, 20 TT, 21, 28, 371; 29/450

[56] References Cited

U.S. PATENT DOCUMENTS

| | | | |
|---|---|---|---|
| 3,874,712 | 4/1975 | Watson | 285/236 |
| 3,925,851 | 12/1975 | Bevans | 24/20 TT |
| 4,010,518 | 3/1977 | Rejeski et al. | 24/371 X |
| 4,128,918 | 12/1978 | Wenk | 285/DIG. 22 X |
| 4,183,120 | 1/1980 | Thorne | 24/20 TT X |

Primary Examiner—Thomas F. Callaghan
Attorney, Agent, or Firm—Joseph V. Tassone

[57] ABSTRACT

A hose clamp structure and hose construction employing same are provided wherein such structure comprises a pair of cooperating interconnectible members each having a plurality of teeth adapted for interconnecting engagement and wherein the members upon being interconnected around an associated hose end extend substantially over a first arcuate length of the hose end with a second arcuate length of the hose end completing the remaining 360° circumference of such hose end. Each of the members is defined as a separate part and has means for connecting the members to the hose end such that when the members are connected to the hose end the second arcuate length of the hose end is employed as clamping means and the connected members and second arcuate length cooperate to define an annular construction enabling the hose end to be clamped around an associated structure.

30 Claims, 9 Drawing Figures

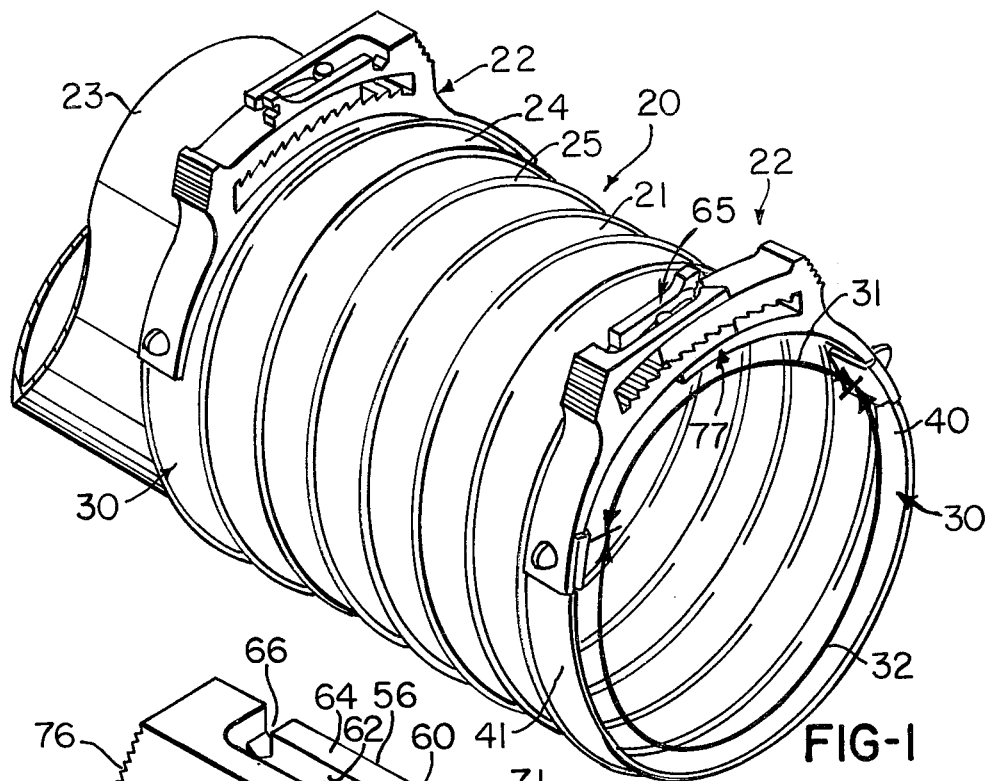
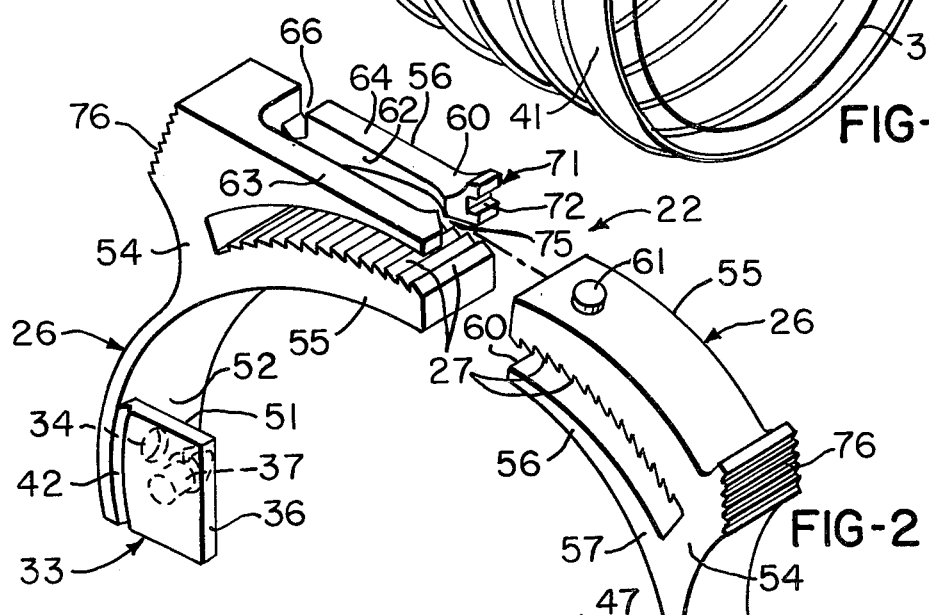
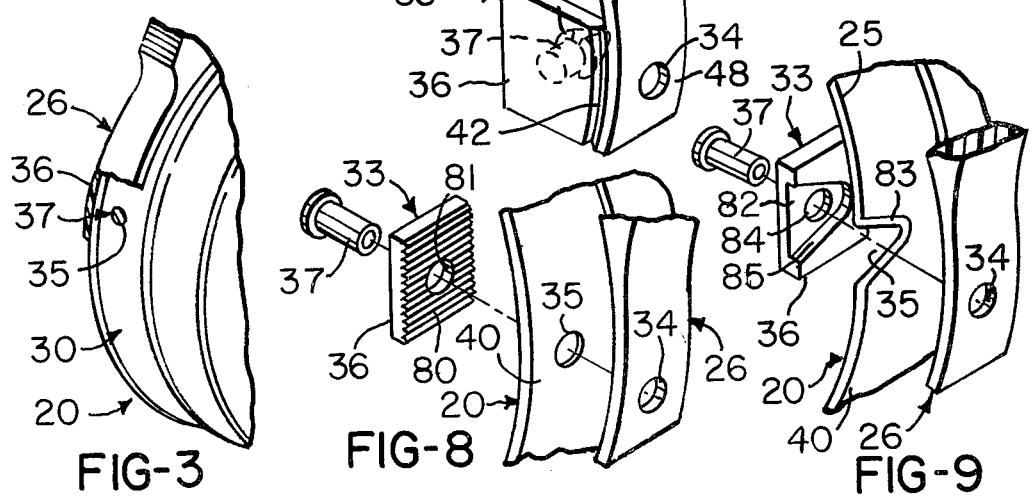

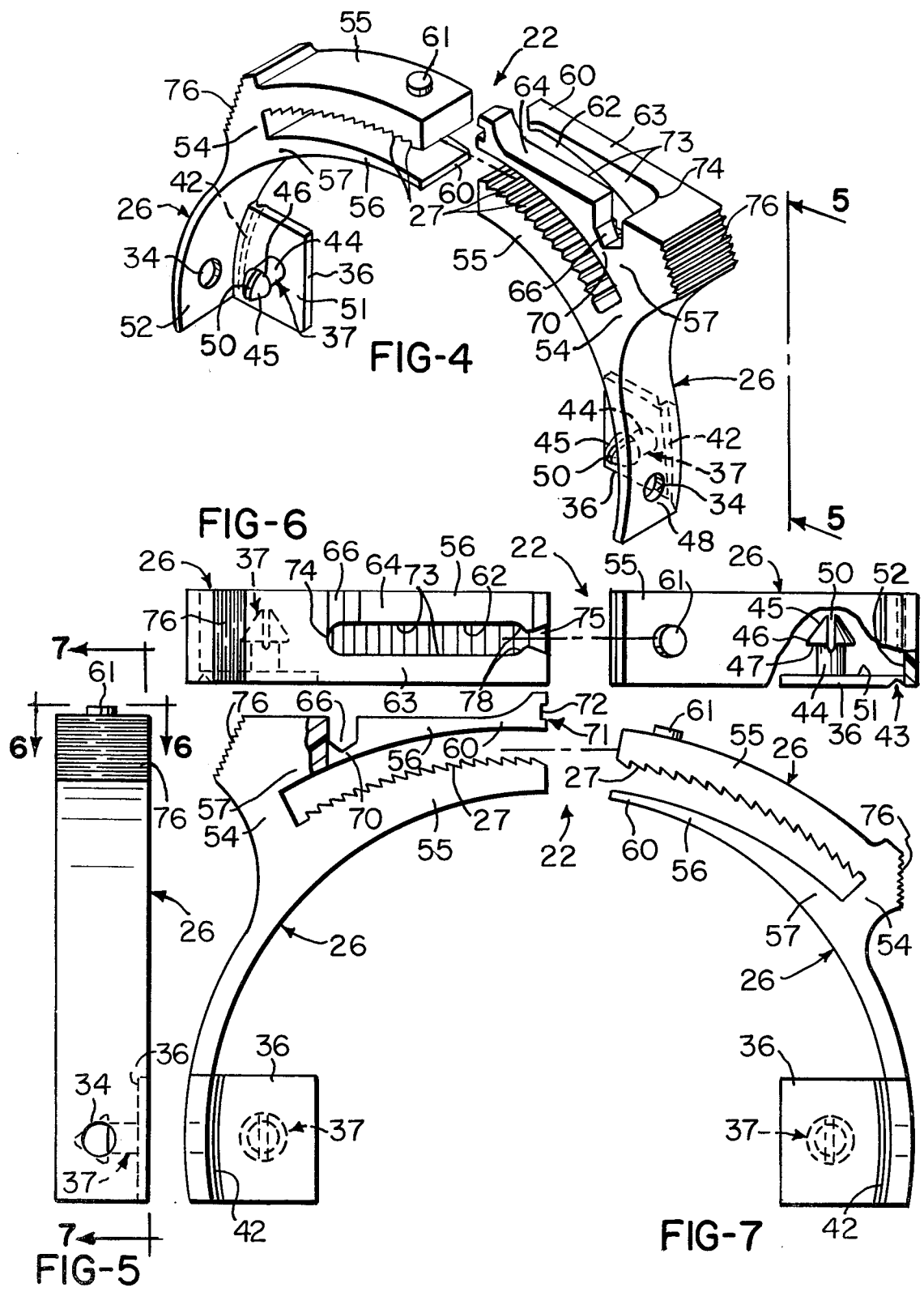

HOSE CLAMP STRUCTURE AND HOSE CONSTRUCTION EMPLOYING SAME

BACKGROUND OF THE INVENTION

1. Field of the Invention

This invention relates to a hose clamp structure and to a hose construction employing same.

2. Prior Art Statement

Hose clamps for flexible hose made primarily of polymeric material are well known and widely used throughout industry and many of these hose clamps consist of an adjustable band which is adapted to be disposed around an associated hose end to clamp the hose end around an associated structure, such as, a tubular conduit, or the like. Examples of hose clamps each defined as an adjustable band are shown in U.S. Pat. Nos. 3,605,200, 3,925,851, and 4,128,918.

It has also been proposed in U.S. Pat. No. 3,874,712 to provide a crimp-on clamp for flexible conduit which has an integral helical wire wherein the clamp uses an over-center toggle link connected to such helical wire.

However, the crimp-on clamp mentioned above is comparatively complex and expensive and is used most efficiently with associated wire-reinforced flexible hose of only one particular size. Similarly, the adjustable band type hose clamp disclosed by the above-mentioned other three patents is only used to clamp hose having a size within a predetermined narrow size range and uses substantial material to surround the hose end thereby adding to the cost thereof.

SUMMARY

It is a feature of this invention to provide a simple and economical hose clamp structure.

Another feature of this invention is to provide a hose clamp structure of the character mentioned which may be provided as an integral part of an overall hose construction.

Another feature of this invention is to provide a hose clamp structure which may be provided as an integral part of a hose construction and which may be readily used with all types of hose constructions including wire-reinforced hose constructions and hose constructions made substantially entirely of polymeric material and without wire reinforcement.

Another feature of this invention is to provide a hose clamp structure of the character mentioned comprised of a pair of cooperating interconnectible members each having a plurality of teeth adapted for interconnecting engagement with such members upon being interconnected around an associated hose end extending substantially over a first arcuate length of the hose end with a second arcuate length of the hose end completing the remaining 360° circumference of the hose end, and wherein each of the members is defined as a separate part and has means for connecting each member to the hose end with the members when connected to the hose end employing the second arcuate length of the hose end as clamping means and with the connected members and second arcuate length cooperating to define an annular construction enabling the hose end to be clamped around an associated structure, such as, a conduit, pipe, nipple, or the like.

Another feature of this invention is to provide a hose clamp structure of the character mentioned in which the means for connecting each member to the hose end comprises an opening in each member adapted to be aligned with a cooperating opening in the hose end, a fastening tab, and a fastener with each fastener being adapted to fasten its member to the hose end by extending through associated aligned openings while fastening its member and tab against opposed surfaces of the hose end.

Another feature of this invention is to provide a hose clamp structure of the character mentioned wherein the pair of cooperating interconnectible members have locking means and means which enables selective locking and unlocking of the locking means without damage to the members.

Another feature of this invention is to provide a hose construction comprising a hose clamp structure of the character mentioned.

Another feature of this invention is to provide a method of making a hose clamp structure of the character mentioned.

Another feature of this invention is to provide a method of attaching a hose construction on an associated conduit employing a hose clamp structure of the character mentioned.

Therefore, it is an object of this invention to provide an improved hose clamp structure, hose construction employing such hose clamp structure, method of making such hose clamp structure, and method of attaching a hose construction on an associated conduit utilizing such improved hose clamp structure having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a perspective view, with a portion thereof broken away, illustrating an exemplary hose construction which comprises one exemplary embodiment of a hose clamp structure of this invention at each end of a flexible hose of such construction with the hose clamp structure at one end of the flexible hose being used to fasten the hose construction about an associated tubular conduit;

FIG. 2 is a perspective view of a pair of cooperating interconnectible members comprising the hose clamp structure used at each end of the hose construction of FIG. 1 with such members being illustrated independently of their hose construction and oriented substantially in the manner in which they would be oriented upon attachment thereof about a flexible hose comprising their hose construction;

FIG. 3 is a fragmentary view with a part of a typical one of the two interconnectible members in cross section, illustrating an opening in the hose end which is used in connecting the interconnectible member to such hose end;

FIG. 4 is a view similar to FIG. 2 showing the members of FIG. 2 as viewed from a substantially diametrically opposite direction;

FIG. 5 is a view taken essentially on the line 5—5 of FIG. 4;

FIG. 6 is a view taken essentially on the line 6—6 of FIG. 5;

FIG. 7 is a view taken essentially on the line 7—7 of FIG. 5;

FIG. 8 is a fragmentary perspective view illustrating a modification of an interconnectible member and its means for connecting same to a flexible hose; and FIG. 9 is a view similar to FIG. 8 illustrating another modification of an interconnectible member and its means for connecting same to a flexible wire-reinforced hose.

DETAILED DESCRIPTION

Reference is now made to FIG. 1 of the drawings which illustrates one exemplary embodiment of a hose construction of this invention which is designated generally by the reference numeral 20 and such hose construction comprises a flexible hose 21 made primarily of polymeric material and a pair of hose clamp structures, each designated generally by the same reference numeral 22, at opposite ends thereof. Each hose clamp structure 22 is provided and connected in position as a component portion of the overall hose construction 20 whereby such hose construction may be readily installed on an associated conduit, pipe, nipple, or the like by a comparatively unskilled installer. In this example of the invention one end of the hose construction 20 is shown disposed around an associated end of a tubular conduit 23 and clamped in position by a hose clamp structure 22 and the opposite end (forward end as viewed in FIG. 1) of the construction 20 is shown with a pair of members of structure 22 connected together for purposes of illustration.

The hose 21 may be any hose known in the art which is normally clamped around an associated structure and such hose may be of the type made primarily of polymeric material and with or without reinforcing means. The exemplary hose 21 is a flexible hose which may be made of polymeric material 24, such as rubber, and has a helical reinforcing means in the form of a helical reinforcing wire 25 provided as an integral part thereof. The helical wire 25 extends along the axial length of the hose 21, as is known in the art, and enables the hose construction 20 to be used in a non-collapsing manner.

Each hose clamp structure 22 comprises a pair of cooperating interconnectible members, (FIG. 2) designated by the same reference numeral 26, with each member having a plurality of parallel saw-toothed projections or teeth 27 adapted for interconnecting engagement, and the members 26 upon being interconnected around an associated hose end, such as an end 30 at each end of the hose 21, extend substantially over a first arcuate length 31 (FIG. 1) of the hose end 30 with a second arcuate length thereof 32 completing the remaining 360° circumference of the hose end 30. As seen in FIG. 2 of the drawings, each of the members 26 is defined as a separate part and each has means designated generally by the reference numeral 33 for connecting the member 26 to the hose end 30. The members when connected to the hose end 30 employ the second arcuate length 32 as clamping means whereby the connected members 26 and second arcuate length 32 cooperate to define what may be considered an annular construction and such annular construction enables the hose end 30 to be clamped around an associated structure, such as the conduit 23 illustrated in FIG. 1.

The means 33 for connecting each member 26 to the hose end 30 comprises an opening 34 in the member 26 (FIGS. 2 and 4) which is adapted to be aligned with a cooperating opening 35 in the hose end 30 (FIG. 3), a fastening tab 36, and a fastener 37. Each fastener 37 is adapted to fasten its member 26 to the hose end 30 by extending through associated aligned openings 34 and 35 while fastening such member 26 and tab 36 against opposed surfaces 40 and 41 of the hose end 30, and as shown in FIG. 1.

Each member 26 of the exemplary embodiment of the invention illustrated in FIGS. 1–7 is preferably defined of a polymeric material in the form of a synthetic plastic material which is capable of being injection molded and has flexibility and resiliency. The exemplary member 26 of FIGS. 1–7 has its fastening tab 36 and fastener 37 defined as an integral part of the member 26 as a single-piece construction with each fastening tab 36 and fastener 37 being hingedly fastened to an associated member along an arcuate hinge connection or hinge 42. As seen at 43 in FIG. 6, each arcuate hinge connection 42 allows sufficient space to accomodate the thickness of an associated hose end 30 whereby it is a simple matter to define an associated opening 35 (by punching, or the like) in the hose end 30 whereupon the fastener is inserted through the opening 35 and through the opening 34 which is aligned with opening 35 to thereby self hold the member 26 in position utilizing its integral fastener 37. The fastening action is achieved merely by bending or folding the fastening tab 36 about its arcuate hinge 42 until the head of the fastener 37 extends through the openings 34 and 35 whereupon the fastener is self held or self fastened in position, and as will be apparent from the following description.

Each fastener 37 of FIGS. 1–7 is preferably defined of the same resilient polymeric material utilized to make its associated member 26 and such fastener comprises a cylindrical rod-like portion 44 (FIG. 4) of a particular diameter which is less than the diameter of the opening 34 in its member and the fastener 37 has a substantially conical head 45 which has a base 46 (FIG. 6) of a diameter which is substantially larger than the diameter of the rod-like portion 44 and larger than the diameter of the opening 34 to thereby define an annular retaining shoulder 47 at the terminal outer end of the rod-like portion. The conical head 45 has at least one axial slit 50 therethrough which enables the conical head 45, to be compressed radially inwardly for insertion of the base 46 thereof through the opening 34 in an associated member 26 after insertion through an aligned opening 35 in the hose end 30. The resilient character of the material defining the member 26 and fastener 37 serves to restore the conical head 45 of such fastener to its configuration prior to compression of the head radially inwardly thereby enabling the retaining shoulder 47 to, in essence, engage an outwardly facing annular portion 48 of the member 26 which surrounds the opening 34 for fastening purposes, and as seen in FIG. 4.

Each member 26 and its fastening tab 36 has integral gripping means for gripping a portion of the hose end and such integral gripping means in this example comprises friction means in the form of the friction surface 51 (FIG. 6) provided on the inside surface of fastening tab 36 and a cooperating friction surface 52 provided on a radially inwardly facing portion of the member 26.

Referring now to FIG. 7 of the drawings it will be seen that each connectible member 26 comprises a support portion which will be referred to as support portion 54, an arcuate jaw 55, and a resilient biasing tongue 56. Each jaw 55 and tongue 56 is supported in a cantilevered manner from an associated support portion 54 with each jaw having the plurality of teeth 27 defined therein as an integral part thereof. The resilient biasing tongues 56, upon interconnecting the cooperating pair of members 26, urge the jaws 55 toward each other to maintain the jaw teeth 27 in toothed engagement. Each tongue 56 tapers from a base portion 57 thereof which adjoins the support 54 to a comparatively flexible terminal end portion 60 and the radially innermost tongue of the members 26 in their interlocked relation is sufficiently tapered and cooperates with the opposed interconnected member to form a substantially semicylindrical continuous inner surface in any interconnected position of a pair of members 26.

As seen in FIGS. 4 and 6 of the drawings one of the jaws 55 has a projection extending substantially radially therefrom and such projection is a substantially cylindrical projection 61 disposed perpendicular to the one jaw.

The tongue 56 of the opposite member 26 which is disposed outwardly of its hose end has an axial slot 62 therein defining the one tongue as a bifurcate tongue with two prongs 63 and 64 (FIGS. 4 and 6). The slot 62 is adapted to receive the projection 61 therewithin with the members 26 interconnected and the projection 61 and prongs 63 and 64 define locking means designated generally by the reference numeral 65 in FIG. 1. The locking means 65 serves to hold the toothed jaws 55 interconnected by holding such jaws against movements parallel to the crests of the teeth 27 and hence parallel to the longitudinal axis of the hose construction 20.

The locking means 65 may be selectively locked and unlocked, as will now be explained, with particular reference being made to FIGS. 4 and 7. The prong 64 has a cutout 66 in its base portion 57 which allows a substantially radial flexing movement thereof with the members 26 interconnected. This radial flexing movement is facilitated because of a comparatively thin portion 70 at the base portion 57 of the prong 64 which allows such prong to be moved a radial distance which is slightly greater than the axial length of the cylindrical rod-like projection 61 and with the prong 64 thus radially outwardly displaced it is a simple matter to slide apart the connected members 26 substantially parallel to the axis of the crests of the teeth 27 and hence parallel to the longitudinal axis of the hose construction 20 and thereby disconnect the members 26 without damage thereto. The prong 64 has means 71 in its terminal end enabling easy gripping thereof and such means 71 comprises a slot 72 which is particularly adapted to receive the end of a hand tool (a screw driver, for example) a fingernail, or the like, to provide flexing movement of the prong 64 for the purpose previously described.

The slot 62 provided in the finger 56 is of substantially oval outline defined by parallel opposed surfaces 73 on the prongs 63 and 64 with an arcuate surface 74 at the inner end of the slot 62 and an inwardly tapering entrance 75 into the slot 62 which is particularly adapted to receive the projection 61 therewithin and provide locking of the members 26 into position as the outer teeth 27 of the jaws 55 are brought into engagement, and in this manner assure that the members 26 are initially held together even with only a few teeth engaged. As the first teeth of members 26 are first interconnected, the projection 61 enters the entrance 75 to the slot 62 causing the prongs 63 and 64 to be initially flexed away from each other and once projection 61 enters the main width of the slot 62 the prongs 63 and 64 snap toward each other to their unflexed positions and as illustrated in FIG. 6 causing transition surfaces 78 between the entrance 75 and slot 62 to engage projection 61 and prevent separating movements of the members 26.

The members 26 may also be provided with corrugated surfaces 76, or the like, adjoining the upper parts of their support portions 54. The surfaces 76 facilitate either manual grasping or grasping by a hand tool, such as pliers, to enable urging of the members 26 toward each other for interconnecting purposes.

The teeth 27 provided on the jaws 55 have only been described in general terms and the construction of such teeth may be in accordance with any suitable construction known in the art. For example, the construction of teeth 27 as well as the detailed construction of jaws 55 and the taper of the radially innermost tongue 56 (with the members 26 in their connected relation) may be essentially as disclosed in the previously mentioned U.S. Pat. No. 4,128,918. Further, the members 26 may be made of flexible resilient plastic materials as disclosed in this patent and the materials disclosed in this patent and the details of the jaws 55, teeth 27, construction of the innermost tongue such as the tongue 56 shown at 77 in FIG. 1, may be as disclosed in this patent whereby as to these items the disclosure in the patent is incorporated herein by reference thereto.

Reference is now made to FIGS. 8 and 9 of the drawings which illustrate modifications of the hose clamp structure of this invention wherein each member 26 thereof has modified connecting means 33 for connecting each member 26 to an associated hose end such as the hose end 30 of the hose 21. As before, the connecting means 33 for each member 26 comprises an opening 34, a fastening tab 36, and a fastener 37; however, it will be seen that the tab 36 and fastener 37 are defined as separate parts in these modifications.

In the FIG. 8 modification, instead of a plain friction surface defining the gripping means such gripping means is provided in the form of saw-toothed projections 80. The saw-toothed projections are particularly adapted to be urged against the inside surface 40 of the hose 21 to prevent slippage thereof. In addition, the teeth 80 may be urged against wire turns of the helical wire 25 defining the hose construction 21 to thereby also use the strength of the helical wire to help fasten the associated member 26 in position and further assure the efficient utilization of the arcuate length 32 of the hose end 30 as a portion of the clamping means. Each member 26 is installed in position on the hose end 30 by placing the openings 34 and 35 in the member 26 and hose 21 respectively in aligned relation whereupon the fastener 37 (in the form of a standard rivet) is installed in position through such openings and through an opening 81 in the tab 36 and riveted in position as is known in the art.

In the FIG. 9 modification of the hose clamp structure the fastening tab 36 and fastener 37 are also provided separate from their associated member 26. However, the fastening tab 36 has a cutout 82 therein which is particularly adapted to receive a convolution 83 which is defined in the helical wire reinforcement 25 comprising the hose end 30 of the hose construction 21. The convolution 83 helps hold its associated member 26 in position and in a similar manner as described previously enables application of substantial clamping forces through the arcuate length 32 of the hose end 30. For example, the cutout 82 is such that the helical wire 25, even though covered with the polymeric material defining the hose 21, nestles within an arcuate surface 85 defining the separate fastening tab 36 whereby the arcuate surface 85 enables application of even greater clamping forces through the utilization of the helical wire 25 provided in the outer portion 30. It will also be noted that the fastener 37 extends through an associated opening 84 in the tab 36, through a hose opening 35 (roughly triangular in shape in this illustration of FIG. 9) and through an associated opening 34 in the member 26. The fastener 37 of this embodiment may also be in the form of a fastening rivet.

Each fastener 37 may be in the form of the usual rivet made of a metallic material and riveted in position utilizing a standard riveting tool, or the like. In addition, each separate fastener may be similar to the integral fastener of FIGS. 1–7 and provided with a flat head at one end and a split conical head 45 at its opposite end to enable installation thereof without a riveting tool, or the like. Also, each fastener 37 of FIGS. 8 and 9 may be defined as an integral part of its separate tab 36.

Thus, it is seen that in accordance with the teachings of this invention an improved hose clamp structure is provided comprised of a pair of cooperating interconnectible members 26, as described. In addition, an improved method of making such a hose clamp structure comprised of a pair of cooperating interconnectible members is provided. Also, a hose construction utilizing a hose clamp structure of the character mentioned is provided. Finally, this invention teaches the provision of an improved method of attaching a hose on an associated conduit, pipe, or nipple, employing a hose clamp structure comprised of a pair of cooperating interconnectible members as described herein and wherein the connecting steps comprise punching or otherwise defining a pair of openings 35 at approximately diametrically opposite positions on a hose 21 to be clampd whereupon each member 26 is fastened in position utilizing an opening 35 in the hose and utilizing associated connecting means 33, whether such connecting means 33 is defined as an integral part of the overall member 26 or whether such connecting means is comprised of separate parts including a separate fastening tab and fastener.

The hose clamp structure of this invention is especially useful when provided with flexible conduit made primarily of polymeric material and such conduit may be substantially unreinforced or may be reinforced by suitable reinforcing means, including a helical wire, or the like. Further, the outer portion of such helical wire, including the outer turns thereof may be used to help attach members 26 of the associated hose clamp structure in position so as to enable the exertion of great clamping forces employing the arcuate length 32 of the hose 21 which is remote from the interconnected members 26 of the hose clamp structure.

While present exemplary embodiments of this invention, and methods of practicing the same, have been illustrated and described, it will be recognized that this invention may be otherwise variously embodied and practiced within the scope of the following claims.

What is claimed is:

1. In a hose clamp structure comprising a pair of cooperating interconnectible members each having a plurality of teeth adapted for interconnecting engagement, said members upon being interconnected around an associated hose end extending substantially over a first arcuate length of said hose end with a second arcuate length of said hose end completing the remaining 360 degree circumference of said hose end, the improvement in which, each of said members is defined as a separate part and has means for connecting the member to said hose end, said members when connected to said hose end employing said second arcuate length of said hose end as clamping means, said connected members and second arcuate length cooperating to define an annular construction enabling said hose end to be clamped around an associated structure.

2. A hose clamp structure as set forth in claim 1 in which said means for connecting each member to said hose end comprises an opening in each member adapted to be aligned with a cooperating opening in said hose end, a fastening tab, and a fastener, each fastener being adapted to fasten its member to said hose end by extending through associated aligned openings while fastening its member and tab against opposed surfaces of said hose end.

3. A hose clamp structure as set forth in claim 2 in which each fastening tab and fastener are defined as an integral part of its member as a single piece construction.

4. A hose clamp structure as set forth in claim 3 in which each member with its integral fastening tab and fastener is defined of a synthetic plastic material.

5. A hose clamp structure as set forth in claim 3 in which each fastening tab is hingedly fastened to its member with its fastener defined as an integral part of the tab.

6. A hose clamp structure as set forth in claim 5 in which each fastener is defined of a resilient material and comprises a cylindrical rod-like portion of a particular diameter which is less than the diameter of the opening in its member and a substantially conical head at the terminal end of the rod-like portion, said conical head having a base of a diameter which is substantially larger than said particular diameter thereby defining an annular retaining shoulder at one end of said rod-like portion, said conical head having at least one axial slit therethrough enabling said conical head to be compressed radially inwardly for insertion of said base thereof through the opening in its member, said resilient material defining each fastener serving to restore each conical head to the configuration thereof prior to compression of the head radially inwardly enabling said retaining shoulder to engage an annular portion of said member surrounding the opening therethrough for fastening purposes.

7. A hose clamp structure as set forth in claim 2 in which said fastening tab and fastener are defined as separate parts.

8. A hose clamp structure as set forth in claim 7 in which at least one of each member and its fastening tab has integral gripping means for gripping a portion of said hose end.

9. A hose clamp structure as set forth in claim 8 in which said integral gripping means comprises friction means.

10. A hose clamp structure as set forth in claim 8 in which said integral gripping means comprises saw toothed projections on at least one of each member and its fastening tab.

11. A hose clamp structure as set forth in claim 2 in which one of each member and its fastening tab has a cut-out therein particularly adapted to receive a convolution in an associated wire reinforcement comprising said hose end to help hold the associated member in position and enable application of substantial clamping forces through said second arcuate length.

12. A hose clamp structure as set forth in claim 2 in which each fastening tab also has an opening therethrough, each fastener is initially separate from its member and tab, and each fastener is fastened in position upon extending same through aligned openings in its associated member, hose end, and fastening tab.

13. A hose clamp structure as set forth in claim 1 in which each of said connectible members comprises a support portion, an arcuate jaw, and a resilient biasing tongue, each jaw and tongue being supported in a cantilevered manner from an associated support portion, with each jaw having said plurality of teeth defined as an integral part thereof, said resilient biasing tongues upon interconnecting said pair of members serving to urge their jaws toward each other to maintain the teeth thereof in toothed engagement.

14. A hose clamp structure as set forth in claim 13 in which each tongue tapers from a base portion thereof which adjoins said support to a comparatively flexible terminal end portion and the radially innermost tongue of said members in their interconnected relation is sufficiently tapered and cooperates with the opposed interconnected member to form a substantially semicylindrical continuous inner surface in any interconnected position of the members.

15. A hose clamp structure as set forth in claim 14 wherein one of said jaws has a projection extending therefrom and one of said tongues has an axial slot therein defining said one tongue as a bifurcate tongue with two prongs, said slot being adapted to receive said projection therewithin with said members interconnected, said projection and prongs defining locking means and cooperating to hold said toothed jaws interconnected by holding said jaws against movements parallel to the crests of said teeth.

16. A hose clamp structure as set forth in claim 15 in which one of said prongs has a cutout in its base portion which allows substantially radial flexing movement thereof with said members interconnected to enable selective locking and unlocking of said locking means.

17. A hose clamp structure as set forth in claim 16 in which said one prong has means in its terminal end enabling easy gripping thereof to facilitate said radial flexing movement.

18. A hose clamp structure as set forth in claim 17 in which said projection is a cylindrical projection disposed substantially perpendicular to said one jaw and said means in said terminal end comprises a slot.

19. A hose clamp structure as set forth in claim 18 in which said slot is of substantially oval outline and has opposed sides defined by substantially parallel opposed surfaces of said prongs.

20. A hose clamp structure as set forth in claim 17 defined as a synthetic plastic material in the form of polyethylene.

21. In a method of making a hose clamp structure comprising the steps of providing a pair of cooperating interconnectible members each having a plurality of teeth adapted for interconnecting engagement, said members upon being interconnected around an associated hose end extending substantially over a first arcuate length of said hose end with a second arcuate length of said hose end completing the remaining 360 degree circumference of said hose end, the improvement in said method wherein said providing step comprises, providing each of said members as a separate part and providing connecting means for connecting each member to said hose end, said members when connected to said hose end employing said second arcuate length of said hose end as clamping means, said connected members and second arcuate length cooperating to define an annular construction enabling said hose end to be clamped around an associated structure.

22. A method as set forth in claim 21 in which said step of providing connecting means for connecting each member to said hose end comprises forming an opening in each member adapted to be aligned with a cooperating opening in said hose end and forming a fastening tab and a fastener, each fastener being adapted to fasten its member to said hose end by extending through associated aligned openings while fastening its member and tab against opposed surfaces of said hose end.

23. A method as set forth in claim 22 in which said steps of forming said fastening tab and fastener comprises forming said fastening tab and fastener as an integral part of its member as a single piece construction.

24. A method as set forth in claim 23 in which said steps of forming said fastening tab and fastener comprises forming these two components by molding same together with their associated component.

25. A method as set forth in claim 23 in which said steps of forming said fastening tab and fastener comprises forming these two components as separate parts independent from their associated member.

26. In a hose construction comprising a hose made primarily of polymeric material and having opposite hose ends, a hose clamp structure connected to at least one of said hose ends, the improvement wherein said hose clamp structure comprises a pair of interconnectible members each having a plurality of teeth adapted for interconnecting engagement, said members upon being interconnected around said one hose end extending substantially over a first arcuate length of said one hose end with a second arcuate length of said one hose end completing the remaining 360 degree circumference of said one hose end, each of said members being defined as a separate part, means for connecting each member to said one hose end, said members when connected to said one hose end employing said second arcuate length of said one hose end as clamping means, said connected members and second arcuate length cooperating to define an annular construction enabling said one hose end to be clamped around an associated structure.

27. In a method of attaching a hose construction on an associated tubular construction comprising the steps of disposing a hose end of said hose construction around said tubular construction and attaching said hose end against said tubular construction with a hose clamp structure, the improvement comprising the steps of, providing a pair of cooperating interconnectible members which define said hose clamp structure, each of said interconnectible members having a plurality of teeth adapted for interconnecting engagement, forming a pair of openings in said hose end at substantially diametrically opposite positions, connecting each of said members to said hose end with associated connecting means, each connecting means having means extending through an associated opening in the hose end, interconnecting said members around said hose end such that said members extend substantially over a first arcuate length of the hose end with a second arcuate length of said hose end completing the remaining 360° circumference of said hose end, said members being connected by urging the teeth thereof in connecting engagement and said members when connected employing the second arcuate length of said hose end as clamping means, said connected members and second arcuate length cooperating to define an annular construction enabling said hose end to be clamped around said tubular construction in an optimum manner.

28. A method as set forth in claim 27 in which said step of forming a pair of openings comprises forming said openings by punching through the hose end.

29. A method as set forth in claim 27 in which said step of connecting each of said members to said hose end with associated connecting means comprises employing connecting means defined as an integral part of its member.

30. A method as set forth in claim 27 in which said step of connecting each of said members to said hose end with associated connecting means comprises employing connecting means having portions which are made independently of its associated member.

* * * * *